(12) United States Patent
Tadokoro et al.

(10) Patent No.: US 6,444,298 B1
(45) Date of Patent: Sep. 3, 2002

(54) ACRYLIC RESIN LAMINATED FILM

(75) Inventors: Yoshio Tadokoro, Otsu; Koji Koyama, Ibaraki, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/520,027

(22) Filed: Mar. 6, 2000

(30) Foreign Application Priority Data

Mar. 5, 1999 (JP) .............................. 11-058075
Jan. 13, 2000 (JP) ........................... 2000-004961

(51) Int. Cl.[7] .............................. B32B 7/02; B32B 27/30
(52) U.S. Cl. .................. 428/213; 428/327; 428/480; 428/516; 428/517; 428/520
(58) Field of Search ................... 428/213, 327, 428/480, 516, 520, 517

(56) References Cited

U.S. PATENT DOCUMENTS

| | | | |
|---|---|---|---|
| 3,793,402 A | 2/1974 | Owens | |
| 5,169,903 A | 12/1992 | Toritani et al. | 525/310 |
| 5,804,287 A | * 9/1998 | Hatakeyama et al. | 428/220 |
| 6,147,162 A | * 11/2000 | Tadokoro et al. | 525/222 |

FOREIGN PATENT DOCUMENTS

JP 7-9484 1/1995

* cited by examiner

Primary Examiner—D. S. Nakarani
(74) Attorney, Agent, or Firm—Fitch, Even, Tabin & Flannery

(57) ABSTRACT

The present invention provides an acrylic resin laminated film comprising a layer comprising an acrylic resin composition containing an acrylic resin and acrylic rubber particles and a layer comprising an acrylic resin containing no impact-resistant material, which has excellent flexibility and can maintain transparency even after coloring treatment, and is suitable for uses such as, for example, interior materials of automobiles, exterior materials of domestic electric appliances, construction materials, exterior materials and the like.

11 Claims, 2 Drawing Sheets

ACRYLIC RESIN LAMINATED FILM

BACKGROUND OF THE INVENTION

1. Field of the Invention

The present invention related to an acrylic resin laminated film which has excellent flexibility and can maintain transparency even after coloring treatment.

2. Description of Related Art

Acrylic reins are utilized in wide variety of uses, irrespective of outdoor or indoor, such as interior materials of automobiles, exterior materials of domestic electric appliances, construction materials (exteriors) and the like, due to excellent transparency, translucency, surface gloss and weather-resistance, and further, because of easiness of coloring by dyes and also excellent ornamental property.

However, acrylic resins generally have poor flexibility and low impact-resistance, causing a problem that they are broken easily by load from outside.

Therefore, imparting of flexibility to an acrylic resin while maintaining properties such as transparency, surface gloss and the like by compounding rubber particles into the acrylic resin has been experimented.

However, when coloring treatment is performed on an acrylic resin containing rubber particles according to ordinary methods such as immersion into a dyeing solution, and the like, the rubber particles in the resin cause whitening, leading subdued color of the whole resin.

There is resultantly a problem that the transparency, translucency, surface gloss and the like specific to acrylic resins deteriorate, and ornamental property decreases, causing poor usefulness as the above-described interior and exterior materials and construction materials.

SUMMARY OF THE INVENTION

The object of the present invention is to provide an acrylic resin laminated film which has excellent flexibility and is not whitened in performing coloring treatment while maintaining properties specific to acrylic resins such as excellent transparency, translucency, surface gloss and the like.

For solving the above-described problems, the present inventors have intensively study an acrylic resin film which has excellent flexibility and can maintain transparency even after coloring treatment.

Resultantly, the present inventors have found that an acrylic laminated film comprising a layer comprising an acrylic resin composition containing an acrylic resin and acrylic rubber particles and a layer comprising an acrylic resin containing no impact-resistant material, which has excellent flexibility and is not whitened in performing coloring treatment while maintaining properties specific to acrylic resins such as excellent transparency, translucency, surface gloss and the like, completing the present invention.

Accordingly, the present invention is an acrylic resin laminated film comprising a layer comprising an acrylic resin composition containing an acrylic resin and acrylic rubber particles and a layer comprising an acrylic resin containing no impact-resistant material.

Further, the present invention is preferably an acrylic resin laminated film, wherein two layers comprising an acrylic resin containing no impact-resistant material is separately laminated on two surfaces of a layer comprising an acrylic resin composition containing an acrylic resin and acrylic rubber particles.

According to the acrylic resin laminated film of the present invention, flexibility is imparted to the acrylic resin laminated film by the presence of the layer comprising an acrylic resin composition containing an acrylic resin and an acrylic rubber particle as an impact-resistant material.

Alternatively, the layer comprising an acrylic resin containing no impact-resistant material such as an acrylic rubber particle and the like (hereinafter, referred to as surface layer) is laminated on the surface (in the preferable embodiment, both surfaces) of the layer comprising an acrylic resin composition containing an acrylic resin and acrylic rubber particles (hereinafter, referred to as flexible layer).

Consequently, even when the acrylic resin laminated film of the present invention is subjected to coloring treatment according to conventional known methods such as immersion of the laminated film into a dyeing solution, only the surface layer can be colored and a problem of whitening due to contact between the flexible layer and the dyeing solution and the like can be prevented, by performing treatments for inhibiting direct contact of the flexible layer with the dyeing solution and the like such as previous masking of the surface of the flexible layer.

Further, in the above-described preferable embodiment, since two surfaces of the flexible layer are coated with the surface layer, coloring treatment can be conducted without causing problems such as a whitening phenomenon and the like even if the acrylic resin laminated film is, in its intact condition, allowed to come into contact with a dyeing solution and the like directly.

Therefore, according to the present invention, the excellent transparency, translucency and surface gloss specific to acrylic resins can be maintained even after coloring treatment while imparting excellent flexibility to an acrylic resin laminated film.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF THE INVENTION

Figure 1:
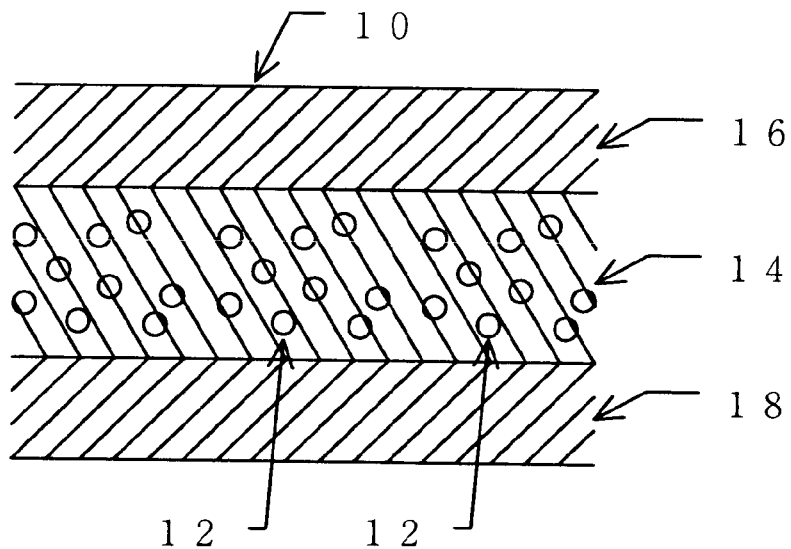
FIG. 1 is a schematic cross sectional view showing one embodiment of the acrylic resin laminated film of the present invention.

As one practical embodiment of the present invention, there is, for example as shown in FIG. 1, an acrylic resin laminated film 10 having 3-layer structure comprising a flexible layer 14 comprising an acrylic resin composition containing an acrylic resin and acrylic rubber particles 12, and two surface layers 16, 18 comprising an acrylic resin containing no impact-resistant material. This acrylic resin laminated film 10 can be used as an acrylic resin multi-layer film by controlling appropriately the total thickness of the resin laminated film 10 because of flexibility imparted by the presence of the flexible layer 14.

If a treatment is so performed that the above-described flexible layer does not come into contact with a dyeing solution and the like in conducting a coloring treatment, the acrylic resin laminated film of the present invention may also be a laminated film, for example, in which a layer (surface layer) comprising an acrylic resin containing no impact-resistance material is laminated on only one surface of a layer (flexible layer) comprising an acrylic resin composition containing an acrylic resin and acrylic rubber particles.

Figure 2:
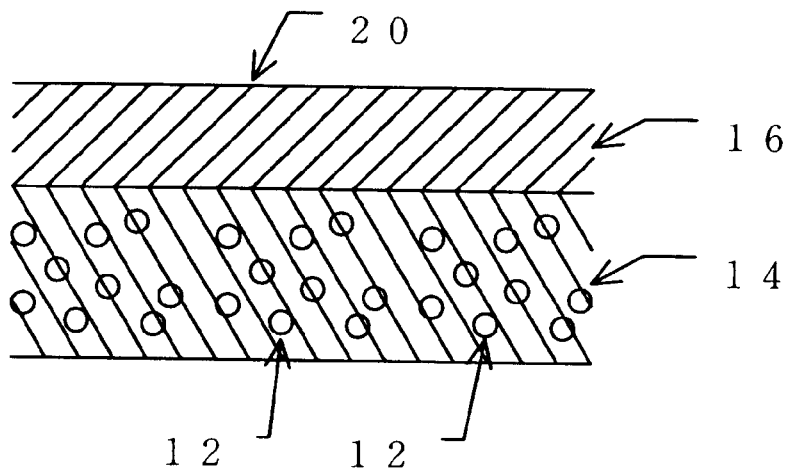
FIG. 2 is a schematic cross sectional view showing another embodiment of the acrylic resin laminated film of the present invention.

As one practical embodiment of this case, there is, for example as shown in FIG. 2, an acrylic resin laminated film 20 having 2-layer structure comprising a flexible layer 14 comprising an acrylic resin composition containing an acrylic resin and acrylic rubber particles 12, and a surface layer 16 comprising an acrylic resin containing no impact-resistant material, wherein the surface layer 16 is laminated on one surface of the flexible layer 14. This acrylic resin laminated film 20 can be used as an acrylic resin multi-layer film by controlling appropriately the total thickness of the laminated film 20 because of flexibility imparted by the presence of the flexible layer 14.

The acrylic resin laminated film of the present invention is not restricted to the above-described practical embodiment, and the design thereof can be appropriately changed within the range wherein the transparency and flexibility of the whole of the laminated film do not deteriorate. Namely, it is possible, for example, to use as the flexible layer, a laminated film of an acrylic resin containing an acrylic rubber particle with other transparent resin having excellent flexibility, or as the surface layer, a laminated film of an acrylic resin with other transparent resin.

[Flexible Layer]

In the acrylic resin laminated film of the present invention, a layer comprising an acrylic resin composition containing an acrylic resin and acrylic rubber particles, namely a flexible layer is, for example, a layer which comprises an acrylic resin containing therein acrylic rubber particles dispersed as an impact-resistance material and imparts excellent flexibility to the acrylic resin laminated film.

Examples of the acrylic rubber used in the above-described acrylic rubber particle include acrylic rubbers such as a copolymer of 2-chloroethyl vinyl ether with an acrylate (ACM) and a copolymer of acrylonitrile with an acrylate (ANM), and acrylonitrile-butadiene rubber (NBR) and the like.

This acrylic rubber particle is not restricted to a particle having a single layer comprising an acrylic rubber, and may also be a rubber particle having a multi-layer structure occluding other resin or rubber component excellent in transparency and flexibility such as an acrylic resin and the like, in the range wherein the flexibility imparting effect does not degrade.

Examples of such a rubber particle having a multi-layer structure include (i) an acrylic polymer having a 2-layer structure comprising an inner layer which is a rubber elastomer composed a copolymer of an alkyl acrylate carrying an alkyl group having 4 to 8 carbon atoms with a poly-functional monomer, and an outer layer which is a hard polymer containing as a main component methyl methacrylate, (ii) an acrylic polymer having a 3-layer structure comprising an innermost layer which is a hard polymer containing as a main component methyl methacrylate, an intermediate layer which is a rubber elastomer composed of a copolymer of an alkyl acrylate carrying an alkyl group having 4 to 8 carbon atoms with a poly-functional monomer, and an outermost layer which is a hard polymer containing as a main component methyl methacrylate, as well as other rubber particles.

The particle size of the acrylic rubber particle is preferably from about 50 to 500 nm. Those having particle sizes lower than the above-described range are not obtained easily, and when the particle size is not more than the above-described range, an effect for imparting flexibility to the acrylic resin tends to become insufficient. On the other hand, when the particle size is over the above-described range, the transparency and translucency of an acrylic resin when the rubber particle dispersed in the resin tend to deteriorate. It is preferable that the particle size of the acrylic rubber particle, when the particle is a particle of single structure such as an acrylic rubber and the like, is particularly from about 50 to 150 nm in the above-described range. Further, when the acrylic rubber particle is a rubber particle of multi-layer structure, it is preferable that the particle size thereof is particularly from about 250 to 350 nm in the above-described range.

It is preferable that the content of the acrylic rubber particle is set in the range from about 20 to 80 parts by weight based on 100 parts by weight of the acrylic resin composition. When the content of the rubber particle is not more than the above-described range, there is a fear that sufficient flexibility can not imparted to the flexible layer, resultantly to the whole of the acrylic resin laminated film. On the other hand, when the rubber particle is contained in an amount over the above-described range, an effect to make the laminated film flexible does not change, and the cost tends to increase to the contrary.

As the acrylic resin for dispersing therein the acrylic rubber particle, conventionally known various acrylic resins can be used. Specifically, polymers of acrylic acid and methacrylic acid, and polymers of acylates and methacylates are listed such as acrylic acid, methacrylic acid, methyl acrylate, methyl methacrylate, ethyl acrylate, ethyl methacrylate, propyl acrylate, propyl methacrylate, butyl acrylate, butyl methacrylate, isobutyl methacrylate, isobutyl methacrylate, hexyl acrylate, hexyl methacrylate, octyl acrylate, octyl methacrylate, lauryl acrylate, lauryl methacrylate, stearyl acrylate, stearyl methacrylate and the like.

The thickness of the flexible layer is not particularly restricted and appropriately selected depending on use objects, and usually, it is set in the preferable range from about 0.02 to 10 mm.

The proportion of the thickness of the flexible layer based on the total thickness of the acrylic resin laminated film is preferably about 50% or more, further preferably about 60% or more. When the proportion of the thickness is not more than 50% based on the total thickness of the laminated film, there is a fear that sufficient flexibility can not be imparted to the laminated film. The proportion of the thickness of the flexible layer is necessarily not more than 100%.

The flexible layer in the acrylic resin laminated film of the present invention is formed by a procedure in which the above-exemplified acrylic rubber particle is compound in given amount into the above-exemplified acrylic resin, and if necessary, various additives described later are further added, and the mixture is melt-kneaded and laminated with a surface layer. The method for forming the laminated film is described later.

[Surface Layer]

A layer comprising an acrylic resin containing no impact-resistant material, namely a surface layer in the acrylic resin laminate film of the present invention is composed of an acrylic resin containing no impact-resistance material such as, for example, an acrylic rubber particle and the like.

Examples of the acrylic resin used in the surface layer are conventionally known various acrylic resins, namely, polymer of acrylic acid and methacrylic acid and polymers of acrylates and methacrylates, as exemplified for the flexible layer.

The thickness of the surface layer is preferably 1 $\mu$m or more. Then the thickness of the surface layer is not more than 1 $\mu$m, the flexible layer tends to be whitened in performing a coloring treatment on the laminated film. The thickness of the surface layer is at most about 500 $\mu$m, and it is preferable that the thickness is set in the range particularly from about 10 to 50 $\mu$m in the above-described range, providing it is in the range corresponding to the use object.

The surface layer is formed by compounding various additives described later according to demands into the above-exemplified acrylic resin, melt-kneading the resulted mixture,-and laminating this together with the flexible layer. The method for forming the laminated body is described later.

[Additives]

Into an acrylic resin constituting the flexible layer and an acrylic resin constituting the surface layer are appropriately compounded additives usually used, for example, coloring agents such as organic dyes, inorganic dyes and pigments, antioxidants, antistatic agents, surfactants and the like.

Particularly, an ultraviolet absorbing agent is suitably used for further improving the weather-resistance of an acrylic resin laminated film.

Examples of the ultraviolet absorbing agent include conventionally known various ultraviolet absorbing agents such as benzotriazole-based, 2-hydroxybenzophenone-based, phenyl salicylate-based ultraviolet absorbing agents and the like.

Specific examples of the benzotriazole-based ultraviolet absorbing agent include 2,2-methylenebis [4-(1,1,3-tetramethylenebutyl)-6-(2H-benzotriazole-2-yl) phenol], 2-(5-methyl-2-hydroxyphenyl)benzotriazole, 2-[2-hydroxy-3,5-bis(a,a-dimethylbenzyl)phenyl]-2H-benzotriazole, 2-(3,5-di-t-butyl-2-hydroxyphenyl) benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl) banzotriazole, 2-(2'-hydroxy-5'-t-octylphenyl) benzotriazole and the like.

Specific examples of the 2-hydroxybenzophenone-based ultraviolet absorbing agent include 2-hydroxy-4-methoxybenzophenone, 2-hydroxy-4-octoxybenzophenone, 2,4-dihydroxybenzophenone, 2-hydroxy-4-methoxy-4'-chlorobenzophenone, 2,2-dihydroxy-4-methoxybenzophenone, 2,2-dihydroxy-4,4-dimethoxybenzophenone and the like.

Specific examples of the phenyl salicylate-based ultraviolet absorbing agent include p-t-butylphenyl salicylate, p-octylphenyl salicylate and the like.

The above-exemplified ultraviolet absorbing agents are used alone or in admixture of two or more.

The compounding amount of the ultraviolet absorbing agent is set in the range of about 0.1 part by weight or more, preferably from about 0.3 to 2 parts by weight per 100 parts by weight of an acrylic resin composition constituting a flexible layer or a surface layer.

[Method for Forming Laminated Film]

As the method for forming an acrylic resin laminated film by laminating the flexible layer and the surface layer, there are listed as follows:

(A) a method comprising the steps of;
  (i) molding separately an acrylic resin containing no impact-resistant material and an acrylic resin composition containing an acrylic resin and rubber particles respectively in the form of a sheet or a film previously, and
  (ii) laminating thereof by using any one of following methods;
    (a) laminating the molded films continuously between heat rolls,
    (b) heat-compressing the molded films with a press,
    (c) molding under pressure or under reduced pressure and simultaneously laminating the molded films, or
    (d) laminating the molded films with a adhesive layer which is inserted between thereof.

(B) a method in which an acrylic resin containing no impact-resistant material and an acrylic resin composition containing an acrylic resin and rubber particles are extruded simultaneously into a sheet or a film, then, the sheet or film is molded while both surfaces thereof being in contact with metal roll surfaces or metal belt surfaces (co-extrusion method), or (C) a method in which an acrylic resin containing no impact-resistant material melt-extruded from a T-die is laminated onto an acrylic resin composition containing an acrylic resin and rubber particles previously molded in the form of a sheet or film.

[Coloring Treatment]

The coloring treatment of the acrylic resin laminated film of the present invention can be conducted according to conventionally known methods such as, for example, dyeing by immersion into a water-solvent system containing a dye dissolved, and the like.

Examples of the solvent used in the dyeing include acetone, benzyl alcohol, ethylene dichloride and the like. Into a water-solvent system, a dispersing agent such as an anionic surfactant and the like may be compounded for improving the dispersibility of a dye.

Figure 3:
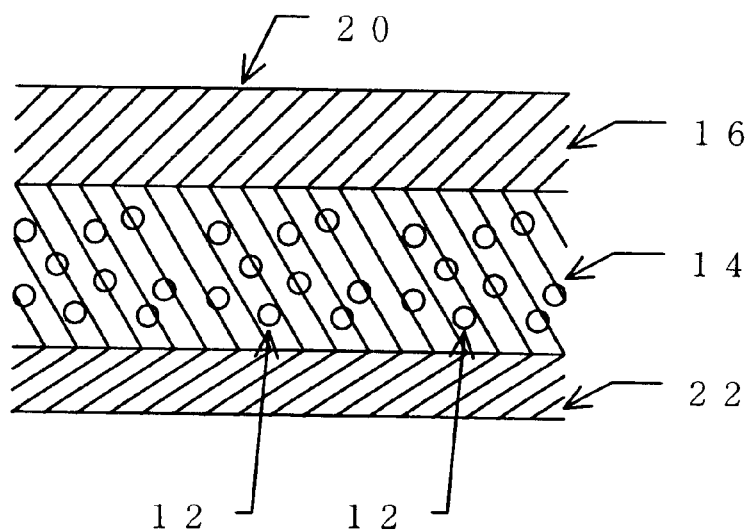
FIG. 3 is a schematic cross sectional view showing another embodiment of the acrylic resin laminated film of the present invention.

Herein, when the acrylic resin laminated film has a 2-layer structure in which one surface layer 16 comprising the acrylic resin containing no impact-resistant material is laminated on one side of the flexible layer 14 comprising an acrylic resin composition containing the acrylic resin and acrylic rubber particles, a treatment should be so performed that the layer does not come into contact with a dyeing solution and the like before performing the coloring treatment. As this treatment, there are, for example, a treatment in which a masking material 22 is laminated on the surface of the flexible layer 14, namely, on the opposite surface of the flexible layer 14 to the surface layer 16 as shown in FIG. 3.

As the masking material, a thermoplastic resin and the like is listed. Examples of the thermoplastic resin include a polyolefin such as polyethylene, polypropylene and the like, and polyester such as polyethylene terephthalate and the like. A polyolefin film is preferably used from a standpoint of a cost.

The thickness of this film is usually about 0.02 to 0.2 mm, preferably about 0.03 to 0.1 mm. When the thickness is not more than about 0.02 mm, there is a fear that a dyeing solution penetrates to the flexible layer. When the thickness is not less than 0.2 mm, a cost becomes high.

Further, an adhesive layer may be laminated on the surface, on which is laminated the flexible layer, of the masking material.

When the acrylic resin laminated film 10 has a 3-layer structure in which two surface layers 16, 18 are laminated on two sides of the flexible layer 14, it is preferable that the surface layer which is exposed to external light is not colored, and the surface layer which is not exposed to external light is colored because a fading of the whole of the acrylic resin laminated film becomes few.

Figure 4:
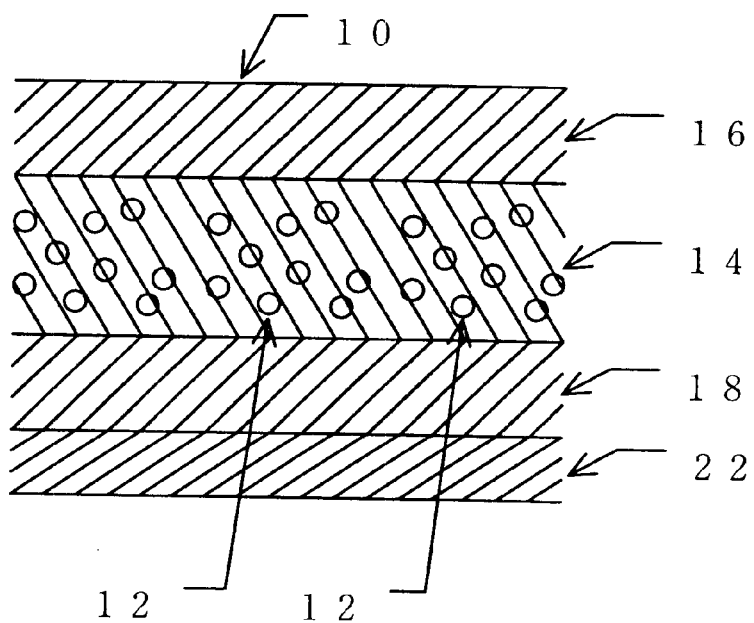
FIG. 4 is a schematic cross sectional view showing another embodiment of the acrylic resin laminated film of the present invention.

In the acrylic resin laminated film 10 comprising the surface layer colored, the flexible layer and the surface layer not colored, it is possible that the acrylic resin laminated film 10 is produced by dispersion a coloring agent such as a pigment, a dyes and the like to the surface layer. But, it is possible that only one surface layer 16 is colored by laminating the masking material 22 on another surface layer 18 among two surface layers and conducting the coloring treatment as shown in FIG. 4. As the masking material 22, the same one described above can be used.

This masking material is peeled off after the coloring treatment.

[Ornamental Treatment on Acrylic Resin Laminated Film]

In the acrylic resin laminated film of the present invention, a graphic and the like, for example, can be printed on its surface for further improving design thereof.

As one example thereof, there is printing on one surface of the acrylic resin laminated film colored smoked color and the like. In this case, lack of printability on full surface which is a defect of a gravure printing method and the like can be compensated, and an ornamental film showing a color like plating and the like can be produced which causes little missing print in extending a film.

In this case, of the graphics and the like printed on the surface of a laminated body, printing of graphics and the like having the same color as that given to the resin laminated film can be omitted.

The acrylic resin laminated film of the present invention has excellent flexibility and can maintain transparency even after coloring treatment, which is suitable for uses such as, for example, interior materials of automobiles, exterior materials of domestic electric appliances, construction materials, exterior materials and the like.

EXAMPLES

The following examples and comparative examples further illustrate the present invention in detail below.

The laminated films and single-layer films in the examples and the comparative examples were evaluated by the following measurements.

(1) Total Light Transmittance (Tt)

The total light transmittance (Tt) of the film was measured according to JIS K 7105 "Test Method of Optical Properties of Plastic", and the difference ($\Delta$ Tt) in total light transmittances(Tt) before and after the coloring treatment was calculated in each case.

Tt after the coloring treatment was smaller as compared with that before the coloring treatment ($\Delta$ Tt increases in negative value).

(2) Haze (H)

The haze (H) of the film was measured according to JIS K 7105 "Test Method of Optical Properties of Plastic", and the difference ($\Delta$ H) in hazes H before and after the coloring treatment was calculated in each case.

The larger value of $\Delta$ H indicates remarkable occurrence of subdued appearance due to whitening and the like by the coloring treatment.

Example 1

60 parts by weight of an acrylic resin pellet and 40 parts by weight of rubber particles having a spherical 3-layer structure, which were acrylic polymers comprising an innermost layer of a methyl mathacrylate cross-linked polymer, an intermediate layer of a soft rubber elestomer containing butyl acrylate as a main component and an outermost layer of a methyl methacrylate polymer, and had an average particle size of about 300 nm., were melt-kneaded to produce an acrylic resin composition containing an acrylic resin and rubber particles, and this was pelletized by a twin screw extruder.

The resulted pellet was supplied in a single screw extruder of 65 mm $\phi$, and on the other hand, a pellet of an acrylic resin containing no impact-resistant material was supplied in a single screw extruder of 45 mm $\phi$. Then, they were co-extruded through a feed block type multi-layer die (HITACHI ZOSEN CORP.) having a set temperature of 255° C., and the co-extruded resin composition in the form of a film was cooled while both surfaces of the film being in contact completely with metal polishing rolls.

Thus, an acrylic resin laminated film 10 having a 3-layer structure composed of a flexible layer 14 and two surface layers 16,18 was obtained as shown in FIG. 1. The total thickness of this laminated film 10 was 2.0 mm, the thickness of the flexible layer 14 was 1.6 mm, and the thickness of the surface layers 16, 18 was each 0.2 mm.

Further, this laminated film was immersed into an aqueous dyeing solution previously controlled to 80° C. (1000 $cm^3$ of ion-exchanged water, 20 g of a dye [trade name: Sumikaron RED E-FBL, manufactured by Sumitomo Chemical Co.,Ltd.], and 20 g of benzyl alcohol) for 10 minutes, to perform a coloring treatment.

The result of the evaluation of this film is shown in Table 1.

Example 2

73 parts by weight of an acrylic resin pellet and 27 parts by weight of an acrylic rubber particle having a 1-layer structure (average particle size: about 100 nm.) were melt-kneaded to produce an acrylic resin composition containing an acrylic resin and acrylic rubber particles, and this was pelletized by a twin screw extruder.

The resulted pellet was placed in a single screw extruder of 65 mm $\phi$, it was extruded through a T-die having a set temperature of 255° C., and the extruded resin composition was cooled while both surfaces of the composition being in contact completely with polishing rolls, to obtain a film having a thickness of 0.5 mm.

Then, the resulted film as a flexible layer and acrylic resin films having a thickness of 0.2 mm previously obtained by press working as surface layers were laminated by a press previously controlled to 200° C.

Thus, an acrylic resin laminated film 10 having a 3-layer structure composed of a flexible layer 14 and two surface layers 16,18 was obtained as shown in FIG. 1. The total thickness of this laminated film 10 was 0.6 mm, the thickness of the flexible layer 14 was 0.3 mm, and the thickness of the surface layers 16, 18 was each 0.15 mm.

Further, this laminated film was immersed into the above-mentioned aqueous dyeing solution for 10 minutes, to perform coloring.

The result of the evaluation of this film is shown in Table 1.

Example 3

An acrylic resin laminated film having a 3-layer structure was produced in the same manner as in Example 1 except that 67 parts by weight of an acrylic resin pellet and 33 parts by weight of a rubber particle having a spherical 3-layer structure was used.

The total thickness of this laminated film 10 was 0.2 mm, the thickness of the flexible layer 14 was 1.2 mm, and the thickness of the surface layers 16, 18 was each 0.03 mm.

Further, this laminated film was performed a coloring treatment in the same manner as in Example 1.

The result of the evaluation of this film is shown in Table 1.

Example 4

An acrylic resin laminated film having a 3-layer structure was produced in the same manner as in Example 3.

The total thickness of this laminated film 10 was 0.66 mm, the thickness of the flexible layer 14 was 0.4 mm, and the thickness of the surface layers 16, 18 was each 0.1 mm.

Then, a masking material 22 [Polyethylene film produced by Sanne Chemical Laboratory, the thickness of 0.06 mm] was laminated on the surface of the surface layer 18 of an acrylic resin laminated film as shown in FIG. 4.

Further, this laminated film 10 was performed a coloring treatment in the same manner as in Example 1.

The masking material 22 was peeled off after a coloring treatment.

The result of the evaluation of this film is shown in Table 1.

Example 5

An acrylic resin laminated film 20 having a 2-layer structure composed of a flexible layer 14 and a surface layer 16 as shown in FIG. 2 was obtained in the same manner as in Example 1 except a feed block type multi-layer die for producing an acrylic resin laminated film having a 2-layer structure was used.

The total thickness of this laminated film 20 was 0.56 mm, the thickness of the flexible layer 14 was 0.4 mm, and the thickness of the surface layer 16 was 0.1 mm.

Then, a masking material 22 [Polyethylene film produced by Sanne Chemical Laboratory, the thickness of 0.06 mm] was laminated on the surface of the flexible layer 14 comprising an acrylic resin laminated film 20 as shown in FIG. 3.

Further, this laminated film 20 was performed a coloring treatment in the same manner as in Example 1.

The masking material 22 was peeled off after a coloring treatment.

The result of the evaluation of this film is shown in Table 1.

Comparative Example 1

60 parts by weight of an acrylic resin pellet and 40 parts by weight of the rubber particle having a spherical 3-layer structure (described above) were used and a pellet was obtained in the same manner as in Example 1.

This pellet was placed in a single screw extruder of 65 mm φ, was extruded through a T-die having a set temperature of 255° C., and the extruded resin composition was cooled while both surfaces of the composition being in contact completely with polishing rolls, to obtain a film having a thickness of 0.125 mm.

Then, this single-layer film was immersed into the aqueous dyeing solution described above for 10 minutes, to perform coloring.

The result of the evaluation of this film is shown in Table 1.

Comparative Example 2

89 parts by weight of an acrylic resin pellet and 11 parts by weight of an acrylic rubber particle having a single-layer structure (average particle size: about 100 nm) were melt-kneaded to produce an acrylic resin composition containing an acrylic resin and acrylic rubber particles, and this was pelletized by a twin screw extruder.

The resulted pellet was placed in a single screw extruder of 65 mm φ, was extruded through a T-die having a set temperature of 255° C., and the extruded resin composition was cooled while both surfaces of the composition being in contact completely with polishing rolls, to obtain a film having a thickness of 0.25 mm.

Then, this single-layer film was immersed into the aqueous dyeing solution described above for 10 minutes, to perform coloring.

The result of the evaluation of this film is shown in Table 1.

TABLE 1

|  | Total light transmittance (Tt) | | | Haze (H) | | |
| --- | --- | --- | --- | --- | --- | --- |
|  | Before coloring | After coloring | ΔTt | Before coloring | After coloring | ΔH |
| Example 1 | 93.4 | 73.5 | −19.9 | 0.8 | 2.8 | 2.0 |
| Example 2 | 93.2 | 72.4 | −20.8 | 1.6 | 5.5 | 3.9 |
| Example 3 | 93.3 | 72.1 | −21.2 | 0.9 | 2.8 | 2.0 |
| Example 4 | 93.4 | 81.2 | −12.2 | 0.8 | 2.0 | 1.2 |
| Example 5 | 93.3 | 80.1 | −13.2 | 0.9 | 1.9 | 1.0 |
| Comparative Example 1 | 93.2 | 53.3 | −39.9 | 1.2 | 60.8 | 59.6 |
| Comparative Example 2 | 93.5 | 66.4 | −27.4 | 0.7 | 8.9 | 8.2 |

As apparent from Table 1, in the resin laminated films of Examples 1,2,3,4 and 5, the degree of reduction in the total light transmittances (Tt) by the coloring treatment was small and the ratio increased of the haze after the coloring treatment was also extremely small.

Namely, according to the acrylic resin laminated films in the examples, there can be obtained laminated films having excellent flexibility and revealing no whitening even after a coloring treatment while maintaining properties specific to acrylic resins such as excellent transparency, translucency, surface gloss and the like.

However, in Comparative Examples 1 and 2, the degree of reduction in the total beam transmittances Tt by the coloring treatment was large and the ratio increased of the haze after the coloring treatment was also large.

A fasten test was further conducted to the acrylic resin laminated film obtained in Example 1 and 4 according to JIS K 6718 "Acrylic Resin".

The conditions of the fasten test is follows:
(1) Test time: 400 Hours
(2) Temperature of black panel: 63° C.
(3) A water was jetted to the surface of the acrylic resin laminated film.
(4) The surface, which had been laminated with the masking material, of the surface layer 18 of the acrylic resin laminated film 10 was directed to a light source.

A color difference (a*) (L*a*b* system) of the laminated film was measured before and after the fasten test according to JIS K 7105 "Test Method of Optical Properties of Plastic". Then, the difference (Δ a*) of the color difference was calculated. It is expressed that a fading is few when Δ a* is little.

The result of the measurement is shown in Table 2.

TABLE 2

|  | Color difference (a*) | | |
| --- | --- | --- | --- |
|  | Before test | After test | Δa* |
| Example 1 | 74.3 | 51.9 | 22.4 |
| Example 4 | 56.7 | 56.6 | 0.1 |

The invention being thus described, it will be obvious that the same may be varied in many ways. Such variations are not to be regarded as a departure from the spirit and scope of the invention, and such modifications as would be obvious to one skilled in the art are intended to be included within the scope of the following claims.

What is claimed is:

1. An acrylic resin laminated film comprising:
   a layer comprising an acrylic resin composition containing an acrylic resin and acrylic rubber particles; and
   a layer comprising an acrylic resin containing no impact-resistant material, wherein the proportion of the thickness of the layer comprising an acrylic resin composition containing an acrylic resin and acrylic rubber particles is about 50% or more based on the total thickness of the acrylic resin laminated film.

2. The acrylic resin laminated film according to claim 1, wherein two layers comprising an acrylic resin containing no impact-resistant material is separately laminated on two surfaces of the layer comprising an acrylic resin composition containing an acrylic resin and acrylic rubber particles.

3. The acrylic resin laminated film according to claims 1 or 2, wherein the particle size of the acrylic rubber particle is from about 50 to 500 nm.

4. The acrylic resin laminated film according to claims 1 or 2, wherein the content of the acrylic rubber particles is from about 20 to 80 parts by weight based on 100 parts by weight of an acrylic resin composition containing an acrylic resin and acrylic rubber particles.

5. The acrylic resin laminated film according to claims 1 or 2, wherein the acrylic resin laminated film is produced by molding a film under the condition wherein two surfaces of the film have been obtained by melt-extrusion molding are simultaneously in contact with metal roll surfaces or metal belt surfaces.

6. The acrylic resin laminated film according to claims 1 or 2, wherein the layer comprising an acrylic resin containing no impact-resistant material is colored.

7. The acrylic resin laminated film according to claim 6, wherein the colored layer comprising an acrylic resin containing no impact-resistant material is colored by dyeing.

8. The acrylic resin laminated film according to claim 2, wherein only one of the layers comprising an acrylic resin containing no impact-resistant material separately laminated on two surfaces of the layer comprising an acrylic resin composition containing an acrylic resin and acrylic rubber particles is colored.

9. The acrylic resin laminated film according to claim 8, wherein the colored layer comprising an acrylic resin containing no impact-resistant material is colored by dyeing.

10. The acrylic resin laminated film according to claim 2, wherein a masking material is further laminated on one surface of the layer comprising an acrylic resin containing no impact-resistant material.

11. The acrylic resin laminated film according to claim 1, wherein a masking material is further laminated on one surface of the layer comprising an acrylic resin containing an acrylic resin containing no impact-resistant material.

* * * * *